UNITED STATES PATENT OFFICE.

HERBERT W. SPELLMAN, OF NEW BRITAIN, CONNECTICUT.

POLISHING COMPOUND.

1,231,307. Specification of Letters Patent. Patented June 26, 1917.

No Drawing. Application filed May 21, 1915. Serial No. 29,537.

*To all whom it may concern:*

Be it known that I, HERBERT W. SPELLMAN, a citizen of the United States, residing at New Britain, Hartford county, State of Connecticut, have invented certain new and useful Improvements in Polishing Compounds, of which the following is a full, clear, and exact description.

My invention relates to a new and useful polishing compound and has for its object to provide a compound for use in the apparatus described and claimed in my application No. 29,538, filed May 21, 1915, in which the articles to be polished are dragged through the compound. It further has for its object to provide a compound which will act more quickly than pure crocus and which, when slightly moist, will not cake on the articles.

The following is a description of an embodiment of my invention. My compound comprises crocus and an enlivening material, such as emery or carborundum, preferably the latter. When slightly moist I also add a little granulated cork, so that it then consists of crocus, cork and emery or carborundum. The preferred proportions are crocus sixty pounds, a hard abrading material, (emery or carborundum) seventy pounds. When cork is used I add an ordinary wooden pail full of granulated cork. The hard abrading substance is reduced to a fine powder or flour before it is added to the crocus. The constituents are thoroughly mixed and are then ready for use. In use the articles to be polished are dragged through the compounds until a high polish appears, the angular position of their axes relative to the path traveled being changed from time to time so as to prevent scoring and to produce a uniform polished surface.

The presence of the hard abrading material enlivens the crocus so that the crocus finish is produced more quickly than it otherwise would be. The cork when used prevents the material from lodging on the slight projections of the articles being polished, such for instance as on the bolsters of knives.

As will be evident, my invention permits of various modifications without departing from the spirit thereof or the scope of the appended claims.

What I claim is:

1. A polishing compound in the form of loose particles comprising crocus and a hard abrading substance mixed together, and both in finely divided form, and granulated cork.

2. A polishing compound in the form of loose particles comprising crocus and carborundum mixed together, and both in finely divided form, and granulated cork.

HERBERT W. SPELLMAN.

Witnesses:
ROBERT K. HITCHENS,
FRANK T. PUNDERSON.

Copies of this patent may be obtained for five cents each, by addressing the "Commissioner of Patents, Washington, D. C."